(12) United States Patent
Imakado et al.

(10) Patent No.: US 7,151,788 B2
(45) Date of Patent: Dec. 19, 2006

(54) LASER PROCESSING DEVICE

(75) Inventors: Masayuki Imakado, Kawasaki (JP); Naohisa Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 10/327,643

(22) Filed: Dec. 24, 2002

(65) Prior Publication Data

US 2003/0138203 A1 Jul. 24, 2003

(30) Foreign Application Priority Data

Dec. 28, 2001 (JP) ............................. 2001-400309

(51) Int. Cl.
*H01S 3/10* (2006.01)
*H01S 3/08* (2006.01)
(52) U.S. Cl. .......................................... 372/101; 372/9
(58) Field of Classification Search ................ 372/101, 372/6, 100, 108, 73, 9
See application file for complete search history.

(56) References Cited

U.S. PATENT DOCUMENTS

| | | | | |
|---|---|---|---|---|
| 4,564,736 A | * | 1/1986 | Jones et al. | 219/121.6 |
| 4,681,396 A | * | 7/1987 | Jones | 385/33 |
| 4,707,073 A | * | 11/1987 | Kocher | 219/121.6 |
| 4,799,755 A | * | 1/1989 | Jones | 385/38 |
| 5,031,999 A | * | 7/1991 | Harada et al. | 359/326 |
| 5,179,269 A | * | 1/1993 | Horie et al. | 235/455 |
| 5,216,687 A | * | 6/1993 | Fujino et al. | 372/70 |
| 5,245,682 A | | 9/1993 | Ortiz, Jr. | |
| 5,370,643 A | | 12/1994 | Krivoshlykov et al. | |
| 5,513,201 A | * | 4/1996 | Yamaguchi et al. | 372/75 |
| 5,684,642 A | * | 11/1997 | Zumoto et al. | 359/740 |
| 5,815,626 A | | 9/1998 | Kuba et al. | |
| 6,606,173 B1 | * | 8/2003 | Kappel et al. | 359/15 |

FOREIGN PATENT DOCUMENTS

| | | |
|---|---|---|
| JP | 10-239598 | 9/1998 |
| JP | 2000-263267 | 9/2000 |

OTHER PUBLICATIONS

European Search Report issued Mar. 2, 2005 from European Patent Office.

* cited by examiner

*Primary Examiner*—Armando Rodriguez
(74) *Attorney, Agent, or Firm*—Staas & Halsey LLP

(57) ABSTRACT

The invention relates to a laser processing device that can change the diameter of a beam spot on an object to be processed, without using a mechanism for changing a distance between a condensing lens and the object. A beam emitted from a laser beam source is condensed by the condensing lens, and is made incident to an optical fiber. The beam emitted from the optical fiber is condensed by a condensing optical system onto an object to be processed. The object is welded using the condensed beam. The laser processing device comprises an adjusting unit that can change the angle of divergence of the beam on the emission surface of the optical fiber. The adjusting unit changes the angle of divergence of the beam, thereby to change the diameter of the beam spot formed on the surface of the object.

2 Claims, 5 Drawing Sheets

LASER PROCESSING DEVICE

BACKGROUND OF THE INVENTION

1. Field of the Invention

The present invention relates to a laser processing device that condenses a beam emitted from a laser beam source, makes the condensed beam incident to an optical fiber, condenses the beam emitted from the optical fiber onto an object to be processed by a condensing optical system, and finely processes the object.

2. Description of the Related Art

Conventionally, there have been developed various kinds of laser processing devices that condense a laser beam emitted from a laser beam source onto an object to be processed, and carry out fine processing of the object such as welding, perforation, and cutting, or irradiation processing of the object.

To facilitate the utilization of this laser processing device, a laser micro-spot welding apparatus, for example, uses an optical fiber in the laser processing device for transmitting a laser beam, thereby to improve the flexibility in the structure of the device and reduce the weight of the device. A laser beam is transmitted to the vicinity of the object to be processed through this optical fiber.

The laser micro-spot welding apparatus using the optical fiber has a condensing optical system that condenses the laser beam transmitted to the vicinity of the object, onto the surface of the object to be processed. This condensing optical system is composed of a combination of a collimator lens and a condensing lens, or a combination of a collimator lens, a galvano-scanner, and an fθ lens.

This condensing optical system condenses the laser beam transmitted through the optical fiber, and forms a beam spot having a desired diameter on the surface of the object to be processed. This object is welded using the beam having this spot diameter.

In this laser micro-spot welding apparatus, the beam spot diameter (nugget diameter) is changed depending on a material of the object to be processed. As a method of changing this spot diameter, a distance between the focal point of the condensing lens or the fθ lens and the object to be processed is changed. It is possible to change the diameter of the spot diameter formed on the object, by changing this distance.

The above changing method, however, has the following problems.

(1) In order to change the diameter of the beam spot that is formed on the object to be processed, it is necessary to provide a special mechanism for changing the distance between the object to be processed and the condensing lens or the fθ lens.

(2) The fθ lens irradiates a beam onto the object approximately perpendicularly to the object, and slight error occurs at this time. When the distance between the object and the fθ lens is changed, there occurs a deviation in the position of the beam spot on the object.

Therefore, in carrying out a continuous spot welding by operating the galvano-scanner, it is necessary to re-define the X-Y coordinates of a galvano-head including the galvano-scanner, each time when a distance between the object to be processed and the fθ lens is changed along the Z axis as the optical axis.

The present invention has been made in the light of the above problems. It is, therefore, a first object of the invention to provide a laser processing device that does not require a special mechanism for changing a distance between a condensing lens and an object to be processed at the time of changing the diameter of a beam spot on the object.

It is a second object of the invention to provide a laser processing device using a galvano-scanner that does not require a re-definition of the X-Y coordinates of a galvano-head each time the diameter of a beam spot, on an object to be processed, is changed.

SUMMARY OF THE INVENTION

In order to achieve the above objects by solving the problems, according to one aspect of the present invention, there is provided a laser processing device that condenses a beam emitted from a laser beam source by a condensing lens, makes the condensed beam incident to an optical fiber, leads the beam emitted from the optical fiber to a condensing optical system, condenses the led beam onto an object to be processed by the condensing optical system, and irradiates the beam onto the object or processes the object. The laser processing device comprises an adjusting unit that changes an angle of divergence of the beam on the emission surface of the optical fiber.

The adjusting unit is a unit that changes an angle of divergence of the beam that is incident to the incidence surface of the optical fiber or changes a beam incident position on the incidence surface of the optical fiber.

Further, the adjusting unit is a beam expander that changes the angle of divergence of the beam on the emission surface or changes the beam diameter on the incidence surface. This beam expander is provided between the laser beam source and the condensing lens.

The adjusting unit moves at least one of the beam that is incident to the optical fiber and the incidence surface of the optical fiber, on a plane parallel with the incidence surface of the optical fiber.

Further, according to another aspect of the invention, there is provided a laser processing device that transmits a beam emitted from a laser beam source, to a condensing optical system, condenses the beam onto an object to be processed, and processes the object. The laser processing device comprises an adjusting unit, that changes an angle of divergence of the beam, in a route through which the beam is transmitted. The adjusting unit changes the angle of divergence of the beam, thereby to change the diameter of a beam spot formed on the object to be processed by condensation.

According to the above structure, it is possible to change the angle of divergence of the beam emitted from the emission surface of the optical fiber, by changing either the angle of divergence of the beam incident to the incidence surface of the optical fiber or the beam incident position on the incidence surface. Therefore, it is possible to change the diameter of the beam spot formed on an object to be processed, without changing the focal point of the condensing optical system.

As a result, it is not necessary to provide a special mechanism for changing a distance between the condensing lens and the object. Further, in the laser processing device using a galvano-scanner, it is not necessary to re-define the X-Y coordinates of a galvano-head each time when the diameter of the beam spot on the object to be processed is changed.

BRIEF DESCRIPTION OF THE DRAWINGS

These and other objects and features of the present invention will become clearer from the following description of the preferred embodiments given with reference to the attached drawings, wherein.

DETAILED DESCRIPTION OF THE PREFERRED EMBODIMENTS

Before describing the embodiments of the present invention, the related art and the disadvantages therein will be described with reference to the related figures.

A first example of a conventional laser processing device will be explained with reference to FIG. 4. The laser processing device shown in FIG. 4 can be used to carry out a micro-spot welding of an object to be processed, by condensing a laser beam to a small spot.

Figure 4:
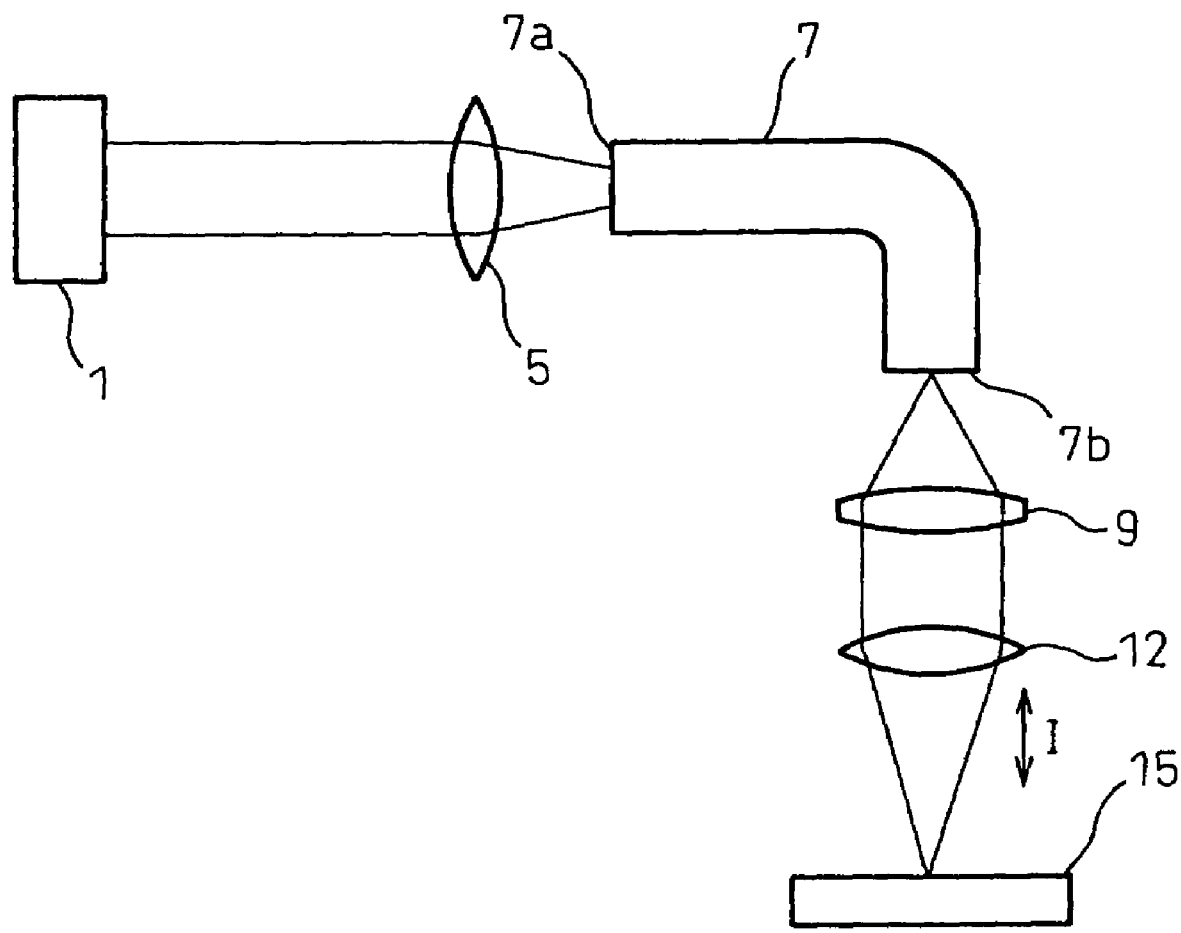
FIG. 4 is a structure diagram of a laser processing device that explains a first example of a conventional laser processing device.

In FIG. 4, a YAG laser beam source 1 emits an approximately parallel beam, and a condensing lens 5 condenses this beam, and makes the condensed beam incident to an incidence surface 7a at one end of an optical fiber 7.

The condensing lens 5 sets the laser beam to have a diameter equal to or smaller than the core diameter of the optical fiber 7, on the incidence surface 7a of the optical fiber 7. As a result, a focal point of the condensing lens is on an emission surface 7b of the optical fiber 7.

A collimator lens 9 sets the beam emitted from the optical fiber 7 into an approximately parallel beam, and a condensing lens 12 focuses this parallel beam onto an object to be processed 15. Spot welding, for example, is carried out on the object to be processed 15 using the condensed beam.

Figure 5:
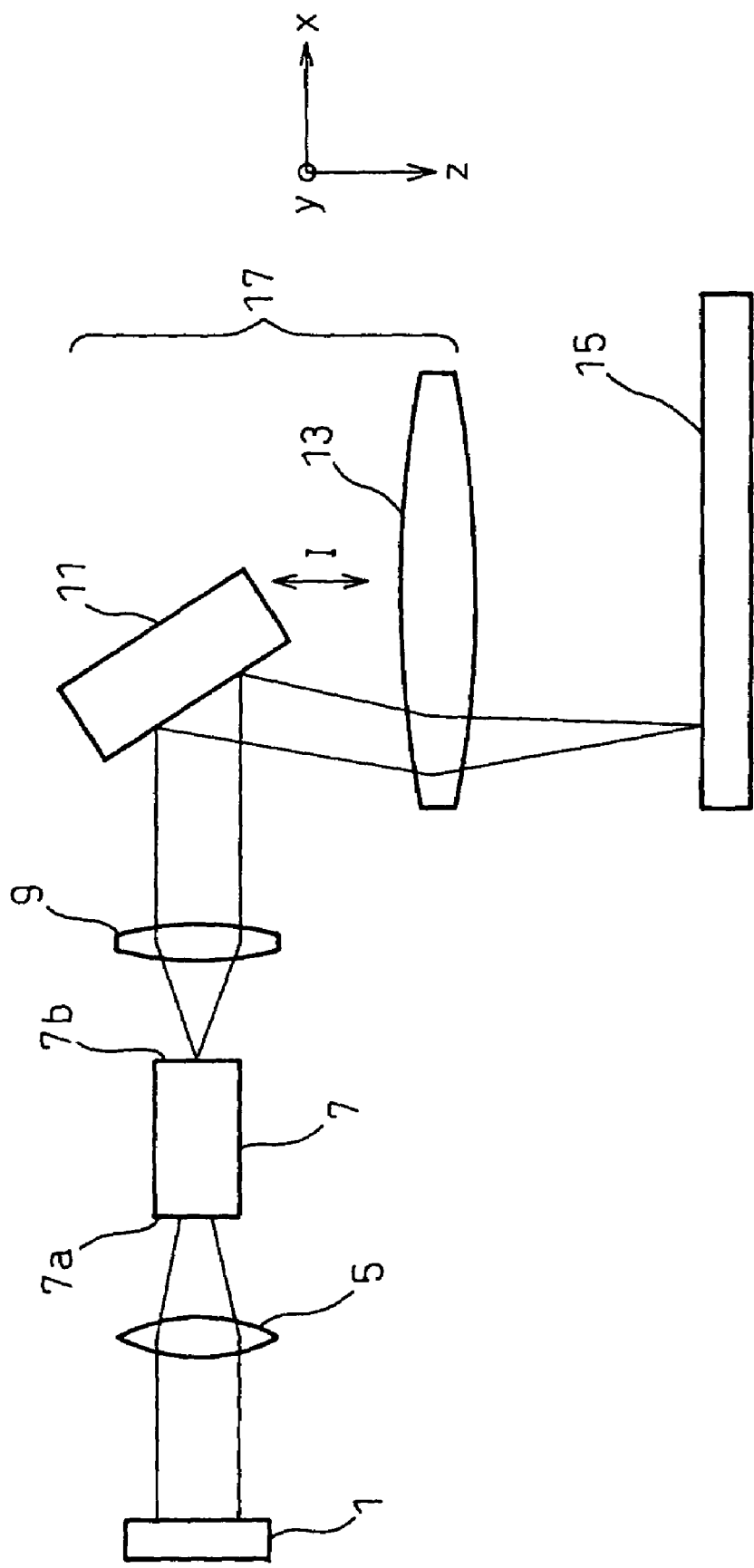
FIG. 5 is a structure diagram of a laser processing device that explains a second example of a conventional laser processing device.

A second example of a conventional laser processing device will be explained with reference to FIG. 5. In FIG. 5, portions that are identical with those in FIG. 4 are have like reference numbers, and an explanation of these portions will be omitted.

The laser processing device of the second example is different from the laser processing device of the first example as follows. A collimator lens 9 sets a beam emitted from an optical fiber 7 to an approximately parallel beam, and a galvano-scanner (a galvano-mirror) 11 reflects this parallel beam. A tele-centric type fθ lens 13 condenses the beam onto the object to be processed 15.

Based on the scanning operation of the galvano-scanner 11, the spot of the beam irradiated onto the object to be processed 15 moves, thereby to continuously carry out spot welding at a plurality of points on the object to be processed 15.

When the laser processing devices of the above two examples control the processing state according to the material of the object to be processed 15, it is necessary to change the spot diameter (nugget diameter) of the beam on the object 15 depending on situations. In this case, the diameter of the beam spot formed on the object to be processed 15 is changed, by changing the distance between the focal point of the condensing lens 12 or the fθ lens 13 and the object to be processed 15.

In the device shown in FIG. 4, the beam spot diameter is changed by moving the condensing lens 12 in an arrow mark I direction along the optical axis direction of the condensing lens 12. In the device shown in FIG. 5, the beam spot diameter is changed by moving the fθ lens 13 relative to the galvano-scanner 11 (hereinafter to be collectively referred to as a galvano-head 17) in an arrow mark I direction along the optical axis direction of the fθ lens 13.

As explained above, according to the conventional laser processing devices in the first and second examples, in order to change the diameter of the beam spot irradiated onto the object to be processed, a distance between the condensing lens and the object to be processed is changed, or a distance between the fθ lens and the object to be processed is changed.

An optical fiber has the following characteristics. When the angle of divergence of a beam incident to the incidence surface of the optical fiber changes, the angle of divergence of the beam emitted from the emission surface also changes. Further, when the beam incident position on the incidence surface changes, the angle of divergence of the beam emitted from the emission surface changes. A laser beam has such propagation characteristics that the beam spot diameter at the beam waist produced by condensing the laser beam is inversely proportional to the angle of divergence of the laser beam. For example, when the angle of divergence of the laser beam incident to the lens is set large, the spot diameter at the focal point of the lens becomes small.

In consideration of these characteristics, the laser processing device of the present invention comprises an adjusting unit that can change the angle of divergence of an emitted laser beam. By using this adjusting unit, the diameter of the beam spot on an object to be processed is changed, without changing a distance between a condensing lens that irradiates the laser beam onto the object and the object.

Figure 1:
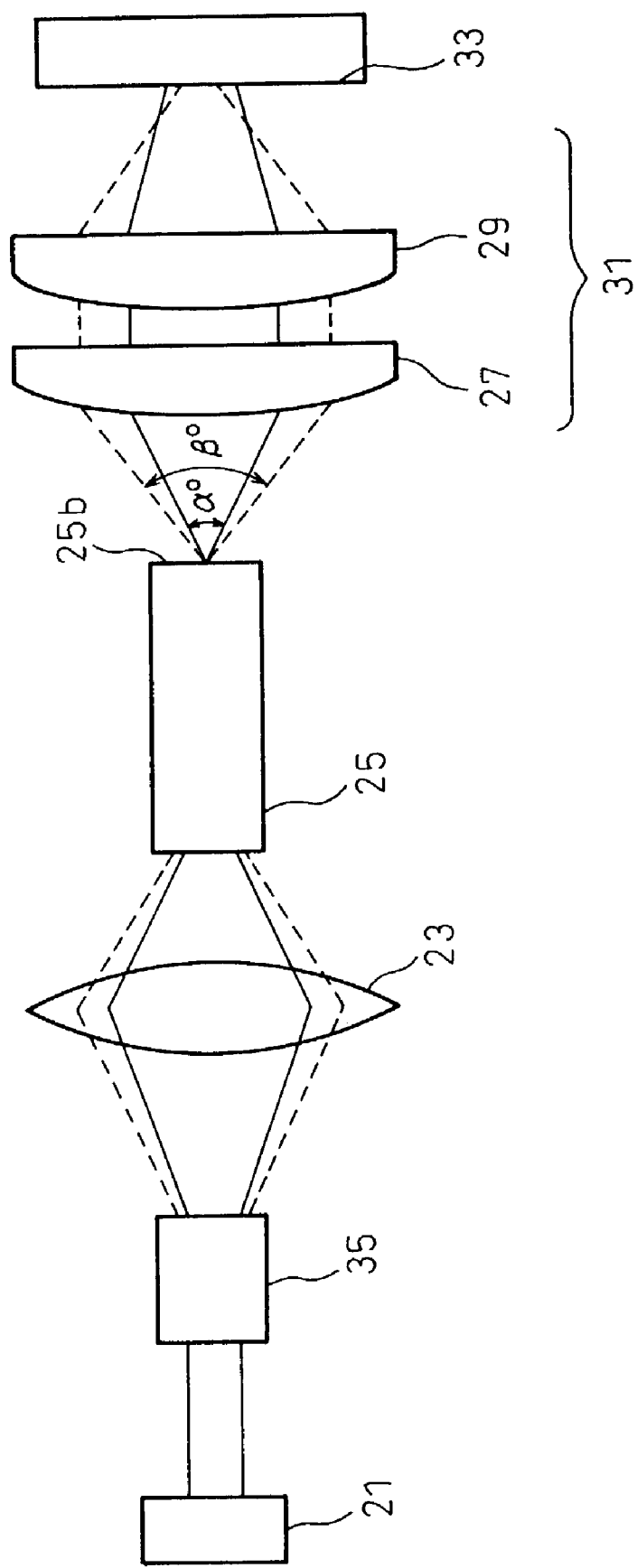
FIG. 1 is a diagram that explains the operation principle of a laser processing device according to the present invention.

FIG. 1 shows a structure diagram of a laser processing device that explains the principle of changing the diameter of a beam spot on an object to be processed without changing a distance between the condensing lens and the object. In order to carry out clear explanation, the laser processing device is schematically shown, by enlarging a part of the device with emphasis.

In FIG. 1, a reference number 21 denotes a laser beam source, 23 denotes a condensing lens that condenses a beam emitted from the laser beam source, and 25 denotes an optical fiber to which the beam condensed by the condensing lens is incident. A beam emitted from an emission surface 25b of the optical fiber 25 is led to a condensing optical system 31 consisting of a collimator lens 27 and a condensing lens 29. The beam from the condensing optical system 31 is condensed onto the surface of an object to be processed 33. The beam is used to carry out spot welding, for example, on the object.

In FIG. 1 showing the principle of changing the spot diameter, an adjusting unit 35 that changes the angle of divergence of a laser beam on the emission surface 25b of the optical fiber 25 is provided between the laser beam source 21 and the condensing lens 23.

As shown in FIG. 1, based on the operation of the adjusting unit 35, when the angle of divergence of the beam on the emission surface of the optical fiber 25 is changed from α° to β°, that is larger than α°, for example, a parallel luminous flux from the collimator 27 shown by a broken line becomes larger than a parallel luminous flux shown by a solid line obtained from the angle of divergence α°.

The focal point of the condensing lens 29 is set on the surface of the object to be processed 33. When the beam of the angle of divergence β° is emitted and is incident to the condensing lens 29, this beam is condensed at the focal point of the condensing lens 29. As the angle of divergence at this foal point is set larger, the spot diameter at this focal point is reduced by the condensing lens 29 and becomes smaller than the spot diameter of the beam at the angle of divergence α°.

As the beam irradiated onto the object to be processed 33 shown by the solid line is changed to the beam shown by the broken line, the beam condensing angle at the focal point of the condensing lens 29 becomes larger. Consequently, a large diameter of the beam spot is changed to a small spot diameter. As explained above, by changing the angle of divergence of the laser beam, it is possible to change the spot diameter of the beam formed on the surface of the object to be processed 33.

According to the above principle of changing the spot diameter, it is not necessary to prepare a special mechanism for changing the distance between the condensing lens 29 and the object to be processed 33, unlike the conventional laser processing device.

In the laser processing device using a galvano-scanner, the adoption of the adjusting unit 35 avoids the need for changing the distance between the fθ lens and the object to be processed each time when the spot diameter on the object to be processed is changed. Therefore, it is not necessary to re-define the X-Y coordinates of the galvano-head each time when the diameter of the beam spot on the object to be processed is changed.

The above phenomenon appears remarkably in a graded-index (GI) optical fiber that has a higher refractive index toward the center. Therefore, it is preferable that the GI optical fiber is used for the optical fiber in the laser processing device.

Examples of the application the laser processing device according to the present invention to a laser micro-spot welding will be explained below. Laser processing devices that use a beam expander as the adjusting unit will be explained as a first embodiment that corresponds to the above first example and a second embodiment that corresponds to the above second example.

[First Embodiment]

Figure 2:
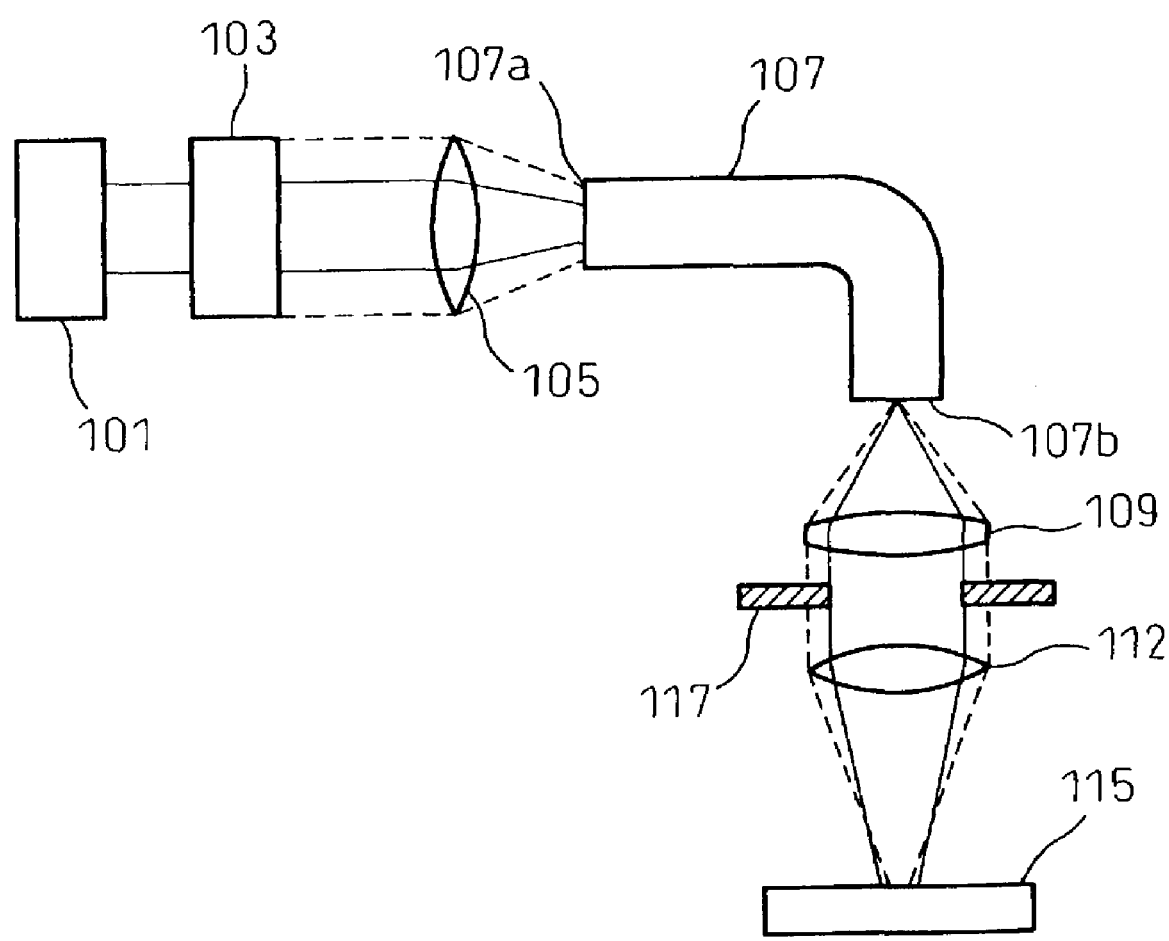
FIG. 2 is a structure diagram of a laser processing device according to a first embodiment of the present invention.

In FIG. 2, a YAG laser beam source 101 emits an approximately parallel beam to a beam expander 103 as an adjusting unit. In the present embodiment, the beam expander 103 is used to change the diameter of the emission beam.

A condensing lens 105 condenses the beam emitted from the beam expander 103, and makes the condensed beam incident to an optical fiber 107.

A collimator lens 109 of a condensing optical system sets the beam emitted from the optical fiber 107 into an approximately parallel beam. A condensing lens 112 of the condensing optical system condenses the parallel beam onto an object to be processed 15, thereby to carry out a spot welding.

When the diameter of the beam emitted from the beam expander 103 is changed from the diameter shown by a solid line to that shown by a broken line, the spot diameter of the beam on an incidence surface 107a of the optical fiber 107 condensed by the condensing lens 105 changes. In other words, the angle of divergence of the beam that is condensed by the condensing lens 105 and is incident to the incidence surface 107a of the optical fiber 107 changes, and the angle of divergence of the beam emitted from an emission surface 107b of the optical fiber 107 also changes.

The angle of divergence of the emission beam on the emission surface 107b of the optical fiber 107 shown by a solid line is changed to the angle of divergence shown by a broken line. Based on this, the beam condensed by the condensing lens 112 shown by a solid line changes to the beam shown by a broken line. The diameter of the beam spot formed on the object to be processed 115 is adjusted, without changing the distance between the condensing lens 112 and the object to be processed 115.

As explained above, it is possible to obtain a desired spot diameter, by adjusting the diameter of the beam emitted from the beam expander 103.

Therefore, according to the above structure, it is not necessary to prepare a special mechanism for changing the distance between the condensing lens 112 and the object to be processed 115, unlike the conventional laser processing device.

[Second Embodiment]

Figure 3:
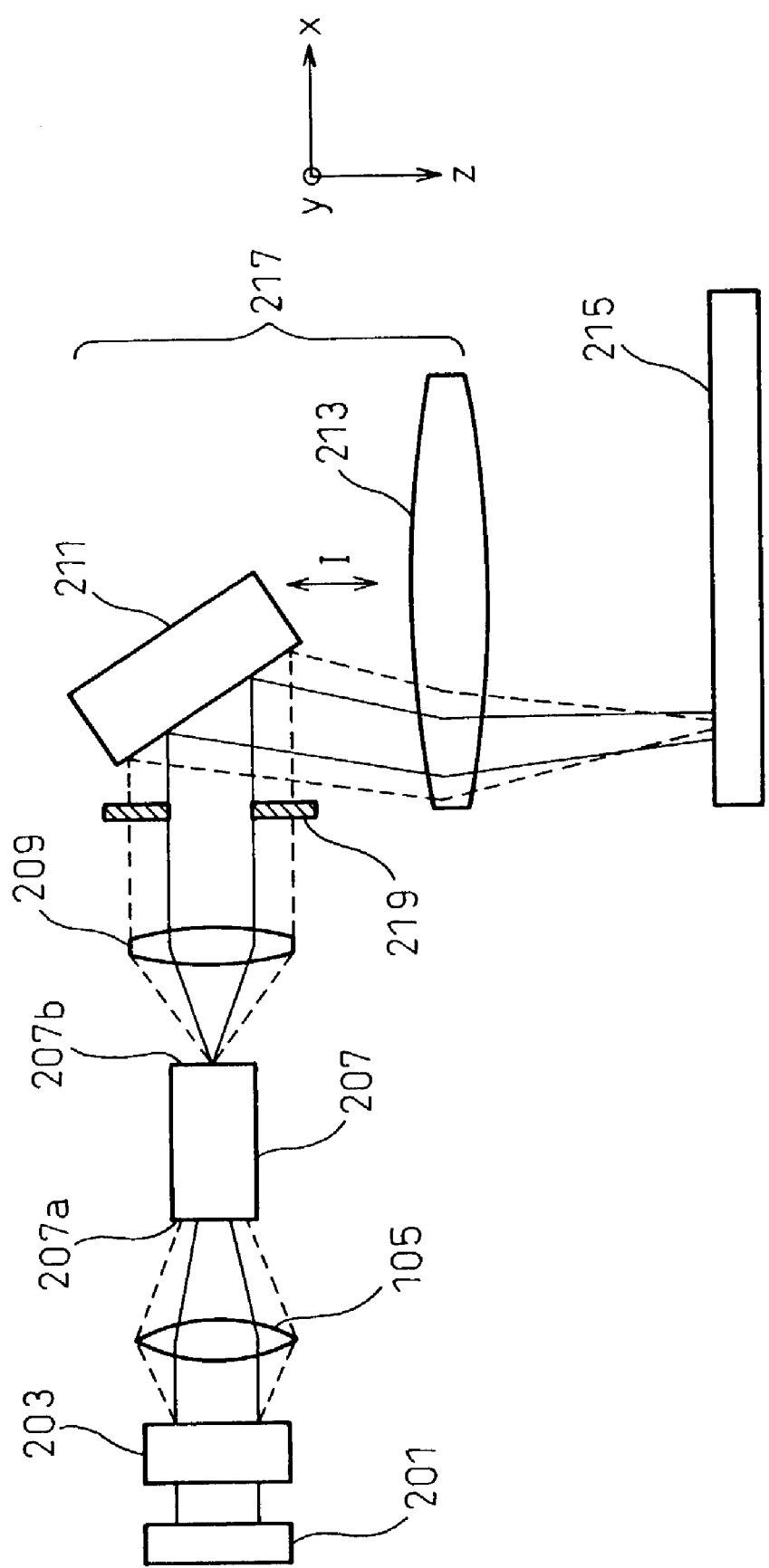
FIG. 3 is a structure diagram of a laser processing device according to a second embodiment of the present invention.

In FIG. 3, a YAG laser beam source 201 emits an approximately parallel beam to a beam expander 203 as an adjusting unit. In the present embodiment, the beam expander 203 is used to change the angle of divergence of the emission beam of the beam expander.

A condensing lens 205 condenses the beam emitted from the beam expander 203, and makes the condensed beam incident to an optical fiber 207.

A collimator lens 209 sets the beam emitted from the optical fiber 207 into an approximately parallel beam. A galvano-head 217 as a condensing optical system, that is, a galvano-scanner (a galvano-mirror) 211, reflects this parallel beam. A tele-centric type fθ lens 213 condenses the beam onto an object to be processed 215. A beam spot having a desired diameter is formed on the object to be processed 215, to thereby carry out spot welding.

Based on the scanning operation of the galvano-scanner 211 as the condensing optical system, the condensing position of the beam on the object to be processed 215 moves, thereby to continuously carry out spot welding at a plurality of points on the object to be processed 215.

When the angle of divergence of the beam emitted from the beam expander 203 shown by a solid line is changed to the angle of divergence shown by a broken line, the spot diameter of the beam on an incidence surface 207a of the optical fiber 207 condensed by the condensing lens 205 changes. In other words, when the angle of divergence of the beam that is incident to the optical fiber 207 changes, the angle of divergence of the beam emitted from an emission surface 207b of the optical fiber 207 also changes.

When the angle of divergence of the emission beam on the emission surface 207b of the optical fiber 207 is changed, the diameter of the beam spot at the focal point of the beam condensed by the fθ lens 213 as the condensing lens is changed. In other words, it is possible to adjust the spot diameter of the beam on the object to be processed 215.

As explained above, it is possible to obtain a desired spot diameter, by adjusting the angle of divergence of the beam emitted from the beam expander 203.

According to the above structure, unlike the conventional device, it is not necessary to prepare a mechanism for changing a distance between the fθ lens 213 and the object to be processed 215 by moving the galvano-head 217 along the Z axis. Further, it is not necessary to re-define the X-Y coordinate system of the galvano-head 217.

The present invention is not limited to the above embodiments. In the above embodiments, the diameter of the beam spot is adjusted by changing the angle of divergence of the beam incident to the incidence surface of the optical fiber 107 or 207. However, it is also possible to adjust the diameter of the beam spot based on a change in the angle of divergence of the beam on the emission surface of the optical fiber, by changing the beam incident position on the incidence surface of the optical fiber. In this case, the adjusting unit may change the beam incident position on the incidence surface of the optical fiber, by moving the beam that is incident to the optical fiber, or by moving the optical fiber. The adjusting unit may move both the beam and the optical fiber.

In the first or second embodiment, when the laser processing device is used for a long time, or when the YAG laser beam source 101 or 201 is exchanged, the beam spot diameter on the object to be processed 115 or 215 may change from a set value. In this case, in the first embodiment, an aperture 117 is inserted into between the collimator lens 109 and the condensing lens 112 as the condensing optical system. A power meter or the like is used to measure beam energy at the position where the spot diameter is formed when the aperture 117 is inserted and when the aperture 117 is not inserted.

The incidence surface 107a of the optical fiber 107 is moved on the plane parallel with the incidence surface 107a of the optical fiber 107, to find a position where a change in the beam energy between the presence and absence of the aperture becomes smallest. It is possible to adjust the spot diameter based on this adjustment.

In the second embodiment, it is also possible to adjust the beam spot diameter in a similar manner, by inserting an aperture 219 between the collimator lens 209 and the galvano-scanner 211.

In the above explanation, the embodiments of the laser processing device according to the present invention are applied to the laser micro-spot welding. However, it is also possible to apply the laser processing device of the present invention to change the diameter of a beam spot formed on an object to be processed in fine processing other than the micro-spot welding or in the irradiation processing on a fine position.

As explained above, according to the present invention, based on the provision of the adjusting unit that changes the angle of divergence of the beam on the emission surface of the optical fiber, it is not necessary to prepare a mechanism that changes a distance between the condensing lens and the object to be processed, unlike the conventional laser processing device.

Further, it is possible to provide a laser processing device using a galvano-scanner that does not require a re-definition of the X-Y coordinates of the galvano-head each time when the diameter of a beam spot on an object to be processed is changed.

According to the present invention, the laser processing device comprises a beam expander as an adjusting unit that changes the angle of divergence of a beam that is incident to the incidence surface of the optical fiber or that changes the beam incident position. The condensing lens condenses the beam emitted from the beam expander. The condensed beam is incident to the optical fiber. Therefore, when the angle of divergence of the beam that is emitted from the beam expander changes, the angle of divergence of the beam that is condensed by the condensing lens and is incident to the optical fiber also changes. The angle of divergence of the beam that is emitted from the emission surface of the optical fiber also changes. When the diameter of the beam that is emitted from the beam expander changes, the beam is condensed by the condensing lens and the diameter of the beam spot on the incidence surface of the optical fiber changes. The angle of divergence of the beam that is incident to the optical fiber also changes, and the angle of divergence of the beam emitted from the emission surface of the optical fiber also changes.

When the angle of divergence of the beam that is condensed by the condensing optical system onto the object to be processed changes, the spot diameter of the beam at the focal point of the condensing optical system also changes. Therefore, by changing the angle of divergence, it is possible to adjust the diameter of the beam spot formed on the object to be processed, easily and with high precision.

The present disclosure relates to the subject matter contained in Japanese Patent Application No. 2001-400309, filed Dec. 28, 2001, the disclosure of which is expressly incorporated herein, by reference, in its entirety.

The invention claimed is:

1. A laser processing device, comprising:
a laser beam source emitting a laser beam;
a condensing lens condensing the laser beam;
an optical fiber having an incident surface receiving the laser beam from the condensing lens and an emission surface emitting the laser beam,
an adjusting unit, which is provided between the laser beam source and the condensing lens, enabling to change an angle of divergence of the laser beam from the condensing lens on the incident surface of the optical fiber; and
a condensing optical system condensing the laser beam emitted from the emission surface of the optical fiber onto an object to be processed by the condensing optical system,
wherein when the angle of divergence of the laser beam on the incident surface of the optical fiber is changed by the adjusting unit, the angle of divergence of the laser beam condensed onto the object to the processed is changed, and a diameter of a beam spot on the object to be processed is changed.

2. A laser processing device according to claim 1, wherein when the angle of divergence of the laser beam on the incident surface of the optical fiber is changed by the adjusting unit, the diameter of the beam spot of the laser beam condensed onto the object to be processed is changed without a change of a focal position of the condensing optical system.

* * * * *